United States Patent [19]

Castelaz

[11] Patent Number: 4,914,604

[45] Date of Patent: Apr. 3, 1990

[54] PROCESSOR FOR ANALYZING ANGLE-ONLY DATA

[75] Inventor: Patrick F. Castelaz, Yorba Linda, Calif.

[73] Assignee: Hughes Aircraft Company, Los Angeles, Calif.

[21] Appl. No.: 255,205

[22] Filed: Oct. 7, 1988

[51] Int. Cl.$^4$ ................................................. G01S 9/56
[52] U.S. Cl. .................................. 364/517; 364/516; 235/411; 235/414
[58] Field of Search ............... 364/516, 517, 455, 456; 235/410–412, 414, 416

[56] References Cited

U.S. PATENT DOCUMENTS

| | | | |
|---|---|---|---|
| 3,950,733 | 4/1976 | Cooper et al. | 340/172.5 |
| 4,167,007 | 9/1979 | McGeoch et al. | 364/517 |
| 4,254,474 | 3/1981 | Cooper et al. | 364/900 |
| 4,319,332 | 3/1982 | Mehnert | 364/516 |
| 4,320,287 | 3/1982 | Rawicz | 364/516 |
| 4,326,259 | 4/1982 | Cooper et al. | 364/715 |
| 4,449,127 | 5/1984 | Sanchez | 364/517 |
| 4,450,530 | 5/1984 | Llinas et al. | 364/513 |
| 4,589,079 | 5/1986 | Peter | 364/516 |
| 4,591,980 | 5/1986 | Huberman et al. | 364/200 |

OTHER PUBLICATIONS

Lipman, Richard P. "An Introduction to Computing with Neural Nets", IEEE ASSP MAG. Apr. 1987.

Primary Examiner—Parshotam S. Lall
Assistant Examiner—Brian M. Mattson
Attorney, Agent, or Firm—Wanda K. Denson-Low

[57] ABSTRACT

An analog associative processor (12) discriminates between intersects representing targets and intersects representing ghosts from angle-only information from multiple sensors (10). The analog associative processor (12) is constructed using a multi-layer substrate that is an analog of the real-world sensor emplacements, angular sensor traces, and coordinate system. An algorithm is implemented by the analog associative processor (12) which detects ghosts by counting pulses received by each intersect from the other intersects. When the number of pulses reaching a given intersect reaches a predetermined threshold, the intersect is identified as a ghost. The analog associative processor (12) then continues until the number of remaining intersects equals the number of total targets. The remaining intersects are then identified as true targets. The analog associative processor (12) is faster than conventional software solutions to deghosting problems and contains few components so that it is inexpensive to manufacture.

19 Claims, 6 Drawing Sheets

PROCESSOR FOR ANALYZING ANGLE-ONLY DATA

BACKGROUND OF THE INVENTION

1. Technical Field

This invention relates to information processors, and more particularly to an analog associative processor utilizing associative coupling between adjacent conductive layers.

2. Discussion

The task of locating targets using multiple sensors is performed by a wide variety of systems. In many systems, each sensor provides a measurement that consists of the angle (azimuth) on which a target lies on a line-of-bearing. With two or more sensors, the location of the target can be determined as the intersection of the two lines-of-bearing. However, with multiple targets, multiple lines-of-bearing will be seen at both sensors. Lines will cross and intersections will be formed at points where no target actually exists. These intersections are called ghosts, and the real target must be distinguished from these ghosts.

The sensors used to provide the angle-only data may be radar, sonar, infrared, optical, or other types of sensors. The sensors may be part of systems such as computerized tomography, multi-beam ultra-sound, nuclear particle tracking, and others. Whatever the system, some method is needed to separate real targets from ghosts. To illustrate the severity of the problem, if ten targets are observed by two sensors, up to 100 intersections can be formed. Since there are only ten targets, that means 90 of the intersections will be ghosts. With 50 targets, 2500 intersections and 2450 ghosts could be formed. Since the sensors have no other information available, no further discrimination of targets can be made by the sensors.

The addition of a third sensor might help to resolve the ambiguities since one would find targets at the intersection of three lines-of-bearing, or triple intersections. However with measurement inaccuracies, three lines-of-bearing corresponding to a true target will not intersect at a single point but will define a triangular region. The problem then is to first determine which triangular regions have small enough areas that they might he targets, and then to sort out the true targets from the ghosts in a group where there are many more intersections than targets. While targets will generally have smaller areas, merely taking the smallest areas will not assure that no ghosts will be chosen.

previous approaches to the deghosting problem have emphasized solutions in software on general purpose computers. One disadvantage with software solutions to the deghosting problem is that they require massive computational power and are exceedingly slow for real-time or near-real-time angle-only target location problems. This is because these problems frequently involve a "combinatorial explosion" and exponential blowup in the number of possible answers. Thus, to solve the deghosting problem, conventional solutions, even using advanced state of the art array and parallel processors, have difficulty handling real-time problems of realistic sizes. For example, conventional solutions of the deghosting problem are sufficiently fast up to about fifteen targets, but become exponentially computation-bound beyond that. For numbers of targets in the range of thirty or so, typical software approaches using integer programming techniques could require virtually years of VAX CPU time.

There exist various neural networks to solve the deghosting problem. While these neural network approaches for solving the deghosting problem are effective, it is desirable to make further improvements in the speed and cost of such processors. Accordingly, it would be desirable to provide an improved processor for solving deghosting problems for angle-only data. It is further desirable to provide a processor for solving deghosting problems that is faster than previous processors. It is also desirable to provide such a processor that has a minimum number of electrical components and can be manufactured at a relatively low cost.

SUMMARY OF THE INVENTION pursuant to the present invention, a processor is provided that can rapidly solve deghosting problems for angle-only data from multiple sensors. The invention is a synergistic application of neural net associative processing technology. In particular, it involves adaptive, massive interconnections of many simple processing elements.

The processor has a multi-layer substrate consisting of simple conductive geometric patterns or lines. The lines in each layer represent lines-of-bearing from one of the sensors to one of the targets. Thus, the number of total lines-of-bearing for each sensor is equal to the total number of targets. In particular, drivers and sensors are connected to each intersecting point where lines-of-bearings from different sensors intersect. A pulse is then initiated by the drivers at each of the intersects, one at a time, so that pulses are conducted along the signal conducting lines. The pulses received at each intersect along those lines that are connected to the pulsed intersect is then sensed by the sensors. The total number of pulses sensed at each intersect is then counted by a counter. When the number of counted pulses at any of the intersects exceeds a predetermined threshold, that intersection is identified as a ghost. Ghosts are then eliminated from further processing steps. The above process is repeated so that pulses are again initiated at each of the other intersects and additional intersects receiving too many pulses again are eliminated as ghosts.

Each time an intersect is found to be a ghost, the number of remaining intersects is counted, and when this number equals the total number of lines from any given sensor (which also equals the number of targets), the processor will stop and identify the remaining intersects as real targets. In brief, the processor uses the fact that ghosts will have more intersects connected to them along the lines-of-bearing than will true targets. Thus, by counting the number of connected intersects (by counting the number of received pulses), those intersects having too many connected intersects are identified as ghosts. In one embodiment of the present invention, the predetermined number, or threshold, of received pulses used to identify a ghost may change rather than remain fixed. More precisely, the processor may adapt this threshold based on previous experience to more quickly arrive at a solution.

DESCRIPTION OF THE PREFERRED EMBODIMENT

Figure 1:
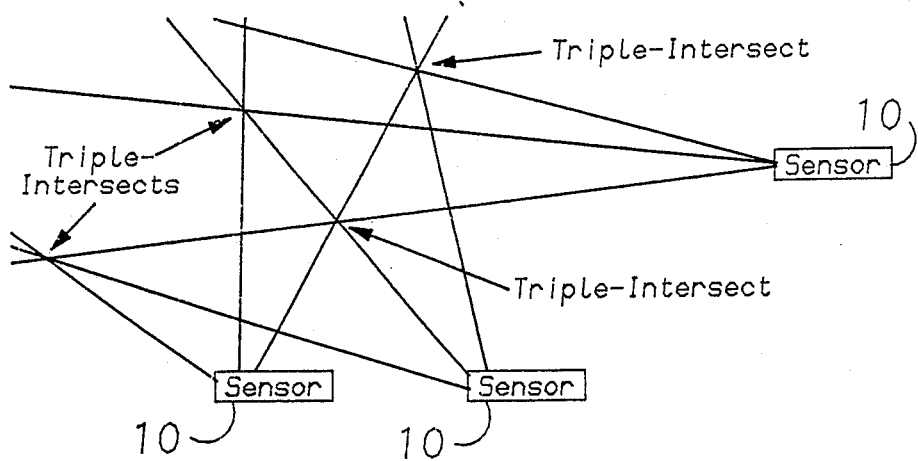
FIG. 1 is a diagram of the angle-only deghosting problem for three sensors.
Figure 2:
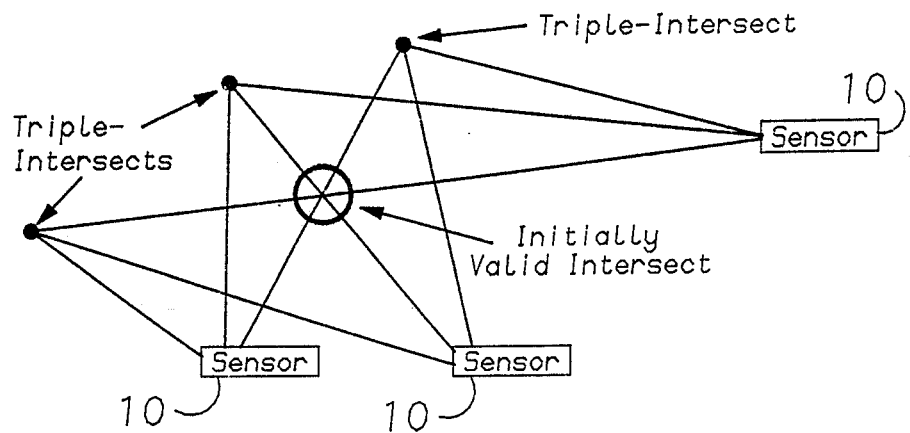
FIG. 2 is a diagram of the desired solution to the angle-only deghosting problem for three sensors.

Referring now to FIG. 1, there is shown a description of the target identification problem for the case of angle-only data from three sensors. The individual sensors 10 detect the presence of targets at a given angle. In FIG. 1, each sensor has made three identifications of targets and will provide three angles as output. From these angles, individual lines or strobes can be drawn. Each point where three strobes intersect represents a triple intersect. Each triple intersect is a potential target. The desired solution to the deghosting problem is shown in FIG. 2. Three of the intersects here have been identified as valid intersects, or targets, while one intersect has been identified as a ghost.

Figure 4:
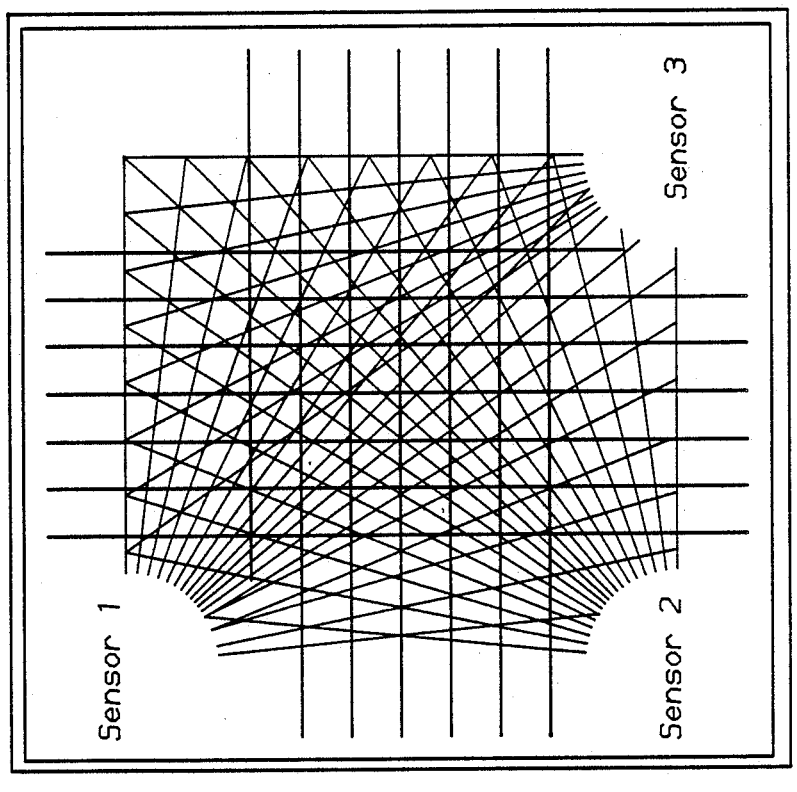
FIG. 4 is a diagram of the multi-layer substrate which forms an analogue of the real world sensor emplacements, sensor traces, and X-Y axis in accordance with the present invention.

Referring now to FIG. 4, the overall geometric layout of the analog associative processor 12 is shown. The analog associative processor 12 is a multi-layer analogue, or replica, of the real world sensor emplacements, angular resolutions and system X-Y resolutions. In particular, the sensors are placed in the analog associative processor 12 in positions that correspond to their position in the real world. A series of conductive lines radiating from each sensor correspond to all possible sensor angles or strobes. In addition, a grid of conductive traces correspond to lines in the X-Y coordinate system. The actual hardware to implement various layers containing each set of lines will be discussed in more detail below.

Figure 3:
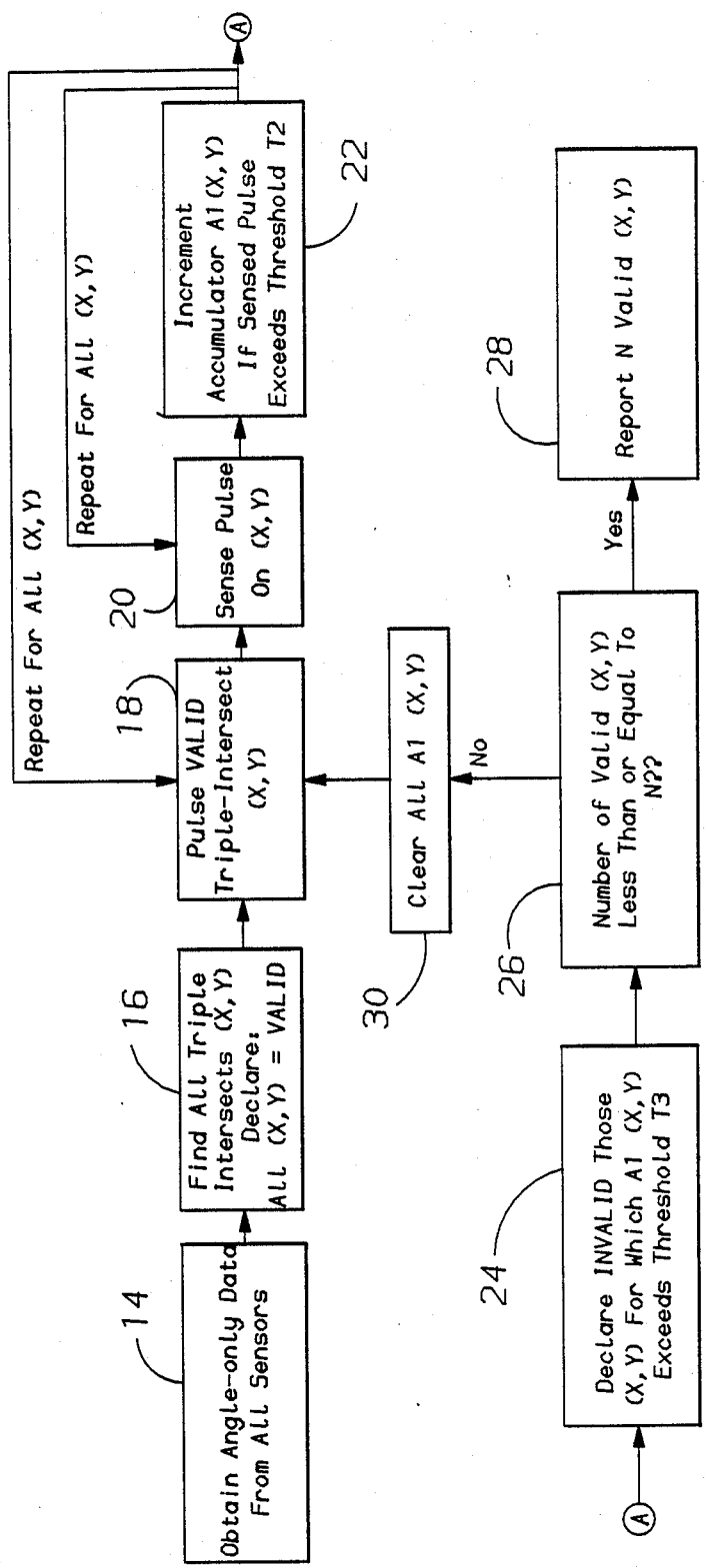
FIG. 3 is a flowchart of the algorithm for solving the deghosting problem in accordance with the present invention.

Referring now to FIG. 3, there is shown a flowchart of a control/processing algorithm of the analog associative processor 12 in accordance with the present invention. In the first step (Step 14), the angular data is obtained from each sensor. This may be a digital representation of the data having an arbitrary resolution. Next, all the triple intersects are found and the (x,y) coordinate locations for the intersects are determined, and all (x,y) locations are initially assumed to be valid (Step 16). The intersects may be found by pulsing all combinations of all actual strobe lines, such as those shown in FIG. 4 for all sensors, and detecting pulses exceeding a threshold T1 at the X-Y intersect coordinates. The detection may be by means of sensing conductive traces corresponding to the (x,y) coordinates in layers adjacent to the conductive traces representing the strobe lines. The pulse may be induced in the adjacent layers by means of capacitive coupling, as will be described in more detail below. Threshold T1 may be a voltage level that may be fixed, or may be adaptive so that, based on previous processing experience, the threshold T1 may be corrected to improve the performance of the analog associative processor 12.

Next, a valid intersect (x,y) is pulsed (Step 18). This may be accomplished by injecting a known voltage level into the circuit at the given coordinate via the conductive X-Y traces shown in FIG. 4. The pulse is then sensed at another intersect point (x,y) (Step 20). The pulse is transmitted from the X-Y intersect along the strobe conductive traces and on to the X-Y intersects between the various layers of the analog associative processor 12. Sensing may be accomplished by separate sensor circuits as will be described in more detail below. If the sensed pulse exceeds a threshold T2, then an accumulator is incremented for that intersect (x,y) (Step 22). T2, like T1, may be fixed or may be adaptive. The fact that threshold T2 is exceeded will indicate that there is another intersect line on one of the same strobes as the pulse triple intersect. Steps 20 and 22 are then repeated for every other intersect (x,y). It should be noted that each time steps 20 and 22 are repeated, additional pulses will be transmitted to the valid triple intersect as indicated in step 18. Once all the intersects have been sensed, steps 18, 20 and 22 are again repeated for a second valid intersect, and pulses from that second valid intersect are sensed for all the remaining intersects. Once steps 18, 20 and 22 have been performed for each intersect, those intersects for which the accumulator has been incremented a number of times exceeding T3 are declared invalid (Step 24).

Next, the number of remaining valid intersects are counted, and it is determined if this number is less than or equal to N, where N is equal to the number of strobes from the sensor having the minimum number of target strobes (Step 26). N will also equal the number of targets. If more intersects than targets are present, then the analog associative processor 12 will clear the accumulator for the remaining valid intersects and will repeat steps 18, 20, 22, 24 and 28. When the number of remaining valid intersects is equal to the number of targets, the remaining (x,y) intersects are declared to be true target locations, and this information is reported to the host CPU (not shown) (Step 28).

The above procedure may be understood intuitively by reference to FIG. 1. When a given intersect is pulsed, the signal will be sensed at all other intersects having strobe lines in common with that intersect. The intersect that is a ghost will receive pulses when each true target intersect is pulsed (in this case three times). The true targets will only receive pulses when the ghost is pulsed (in this case a single pulse each). Thus, the ghosts will receive three pulses and the targets one. It can be seen that by appropriately setting the threshold T3, ghosts can be distinguished from targets.

Figure 5:
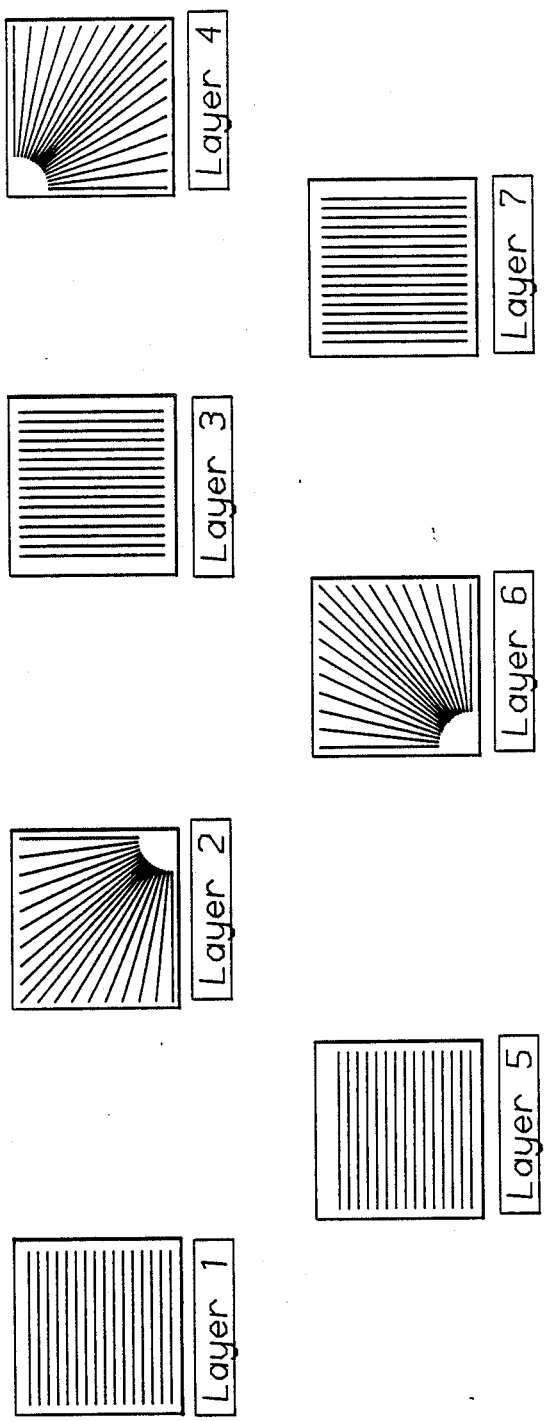
FIG. 5 is a diagram of the individual layers in the multi-layer substrate of the analog associative processor in accordance with the present invention.

Referring now to FIG. 5, there is shown a series of layers which make up the multi-layer substrate grid of the analog associative processor 12 in one embodiment of the present invention. As shown in FIG. 5, the X-Y traces may be implemented as conductive lines, such as copper lines on a printed circuit substrate. Layers one and five contain lines corresponding to the X lines. Layers three and seven contain lines corresponding to the Y lines. Layers two, four and six correspond to all possible sensor angles from each of the sensors one, two and three, respectively. It is noted that each line shown on FIG. 4 is implemented in at least one layer in FIG. 5.

Repetitive layers of the same pattern are used in order to insure maximum coupling among adjacent layers. Each layer is arbitrarily thin and is separated from all adjacent layers by an arbitrarily thin dielectric. It is preferred that each layer containing sensor strobe lines be sandwiched between two layers containing the X and the Y coordinate lines. It may be desirable to cover the multi-layer substrate of the analog associative processor 12 above and/or below by a ground plane to shield it from unwanted electromagnetic interference.

Figure 6:
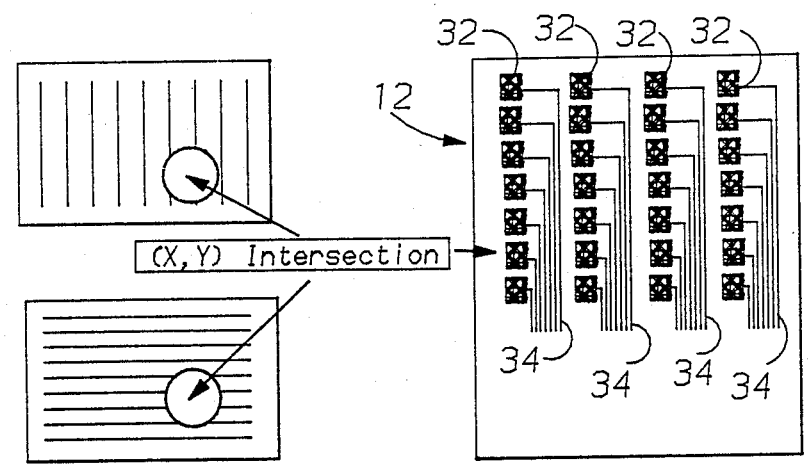
FIG. 6 is a drawing of the conductive pads in accordance with the preferred embodiment of the analog associative processor in accordance with the present invention.

In FIG. 6, there is shown an alternative embodiment of the analog associative processor 12 in accordance with the present invention. This embodiment differs from that shown in FIG. 5 by the use of conductive pads 32 at each (x,y) intersection. Thus, it is the array of conductive patches 32 which follow the prescribed geometric lines for the X-Y pattern layers shown in FIG. 5. The traces for the sensor strobe layers remain solid lines. In addition, each conductive pad 32 is independently accessible through independent access lines 34. The embodiment shown in FIG. 6 is more expensive than the embodiment shown in FIG. 5, since it requires the manufacture of separate pads 32 and access lines 34. However, it provides improved coupling between layers so that less sensitive sensor circuitry is required.

Figure 7:
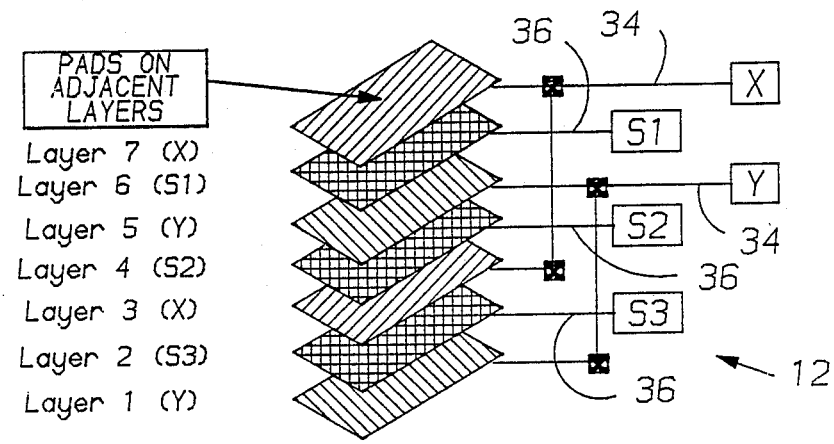
FIG. 7 is a diagram showing the arrangement of the various layers of the analog associative processor in accordance with the present invention.

Referring now to FIG. 7, the seven layers in FIG. 5 are shown in their respective positions in the analog associative processor 12. Also, the X-Y access lines 34 are shown. However, the bundle of individual access lines shown in FIG. 6 are depicted as single lines in FIG. 7. Additional layers which may be required for access lines 34 are also not shown. Sensor layer access lines 36 are also shown connecting each of the three sensor layers. Again, individual lines permitting access to each strobe line on the sensor layers are shown as one single line 36 in FIG. 7.

Figure 8:
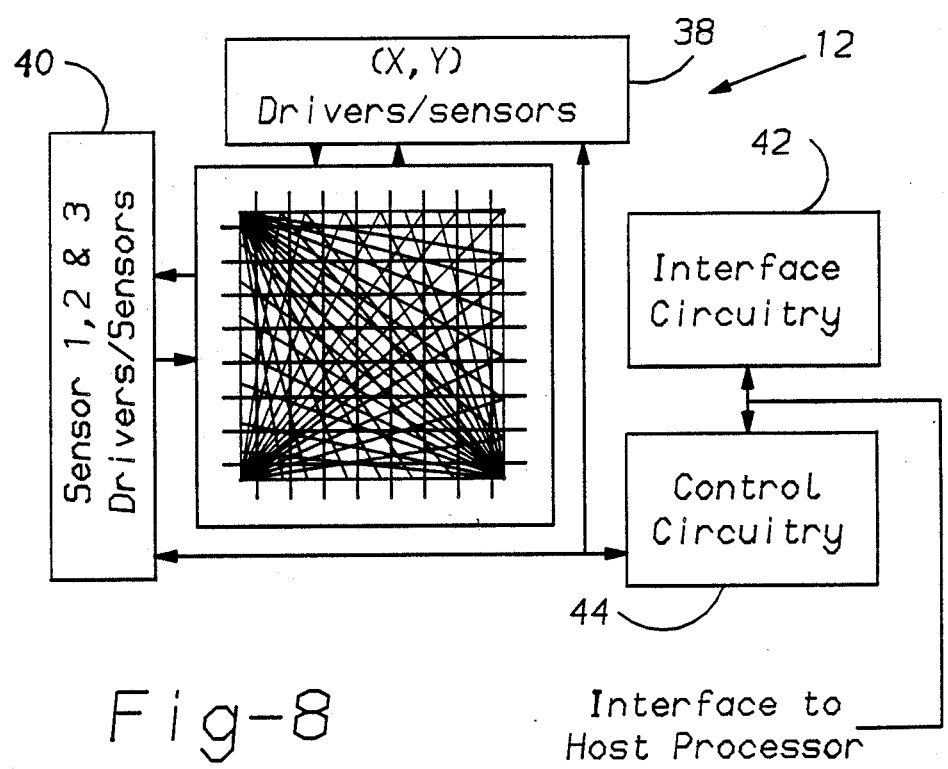
FIG. 8 is a diagram of the board layout of the analog associative processor in accordance with the present invention.

In FIG. 8, the functional description of the total board layout of the analog associative processor 12 is shown. X-Y drivers/sensors 38 are connected to the traces in the X-Y layers, shown in FIG. 5, or alternatively, to each individual conductive pad 32 shown in FIG. 6. Similarly, a group of Sensor drivers/sensors 40 are connected to the traces on the sensor strobe lines through access lines 36. The X-Y drivers/sensors 38 perform the function of initiating the pulses at (x,y) locations corresponding to intersects of the strobe lines. Initiation of the pulses is described in step 18 in FIG. 3. The X-Y drivers/sensors 38 also perform the function of detecting the pulses at the (x,y) locations corresponding to the other intersects. This corresponds to step 20 in FIG. 3. The Sensor driver/sensors 40 performs the function of pulsing the strobes from the sensor data to produce signals at all the intersects of the strobe lines. This signal is then detected on the (x,y) coordinates by the X-Y driver/sensors 38. This corresponds to step 16 in FIG. 3.

Overall, the processing performed by the analog associative processor 12 is as follows. The initial inputs indicating the strobe angles for each strobe for each sensor is fed to the analog associative processor 12 by a host processor (not shown) to an interface circuit 42 shown in FIG. 8. This information is then fed from the interface circuit 42 to a control circuit 44. The control circuit 44 directs the information to the Sensor driver/sensor 40 which will excite the traces corresponding to the sensor angles. The above processing may be accomplished in a number of ways by the control circuit 44 and the Sensor driver/sensors 40. For example, the processing may be in the amplitude domain, where single pulses are appropriately timed and sensed via threshold levels to direct a signal to the appropriate trace. Alternatively, the processing may be in the frequency domain where signals of the appropriate frequency content are used and localized combinations sensed using the appropriate filters.

Once the sensor traces are pulsed by the Sensor driver/sensor 40, the X-Y driver/sensor 38 will find the (x,y) intersect having a response that exceeds T1 to detect all of the intersects. The transmission of the pulses from the sensor traces to the X-Y traces will be caused by signal coupling between layers in the multi-layer substrate of the analog associative processor 12. For example, in the preferred embodiments, where there are electrical signals passing through the traces, there may be capacitive coupling between the adjacent layers. It should be noted however that other means of coupling are possible, such as magnetic or optical coupling between the successive layers. For example, in an optical embodiment, some of the functions of the analog associative processor 12 may be implemented with optical components. Whatever the mode of coupling, it is an important characteristic of the coupling that the speed of the coupling be fast, and that the coupling strength decrease with distance away from the excited intersect. In this way, the intersect that is closest to the pulsed intersect will have a stronger induced signal than any other point.

Once the intersects are detected, the remaining steps, 18 through 30 in FIG. 3, are performed by the X-Y driver/sensor 38 under the control of the control circuit 44. Once valid targets have been detected, the (x,y) locations of the targets may be sent from the control circuit 44 to the interface circuit 42 and to the host processor.

It will be appreciated that the analog associative processor 12 described above is inexpensive to produce using conventional printed circuit board technology and requires only simple support circuitry. Moreover, it performs deghosting of angle-only data at extremely high speeds. It is estimated that using one nanosecond pulses in the amplitude domain, fifty targets may be located, with no false targets, using three fixed sensor sites, in approximately 40 milliseconds. This is at least three to four orders of magnitude faster than software implementations using integer programming algorithms. Even higher speeds are obtainable, limited by support circuitry and by millimeter wave effects in the multi-layer printed circuit substrate itself. Those skilled in the art can appreciate that other advantages can be obtained from the use of this invention and that modifications can be made without departing from the true spirit of the invention after studying the specifications, drawings, and following claims.

What is claimed is:

1. In a processor for distinguishing real targets from ghosts with angle-only data from at least three sensors, said angle only data including multiple lines-of-bearing from each of said sensors, the improvement comprising:
   a plurality of signal conducting lines, each of said lines oriented to represent one line-of-bearing from one of said sensors;
   means for determining the points where at least three of said lines intersect;
   means for initiating a pulse at each of said intersection points, one at a time, said pulse being conducted along said signal conducting lines;

means for counting conducted pulses received at each of said intersecting points;

means for determining whether the number of counted pulses at any of said intersecting points exceeds a predetermined number, wherein once said predetermined number is exceeded for a given intersecting point, that point no longer receives pulses and is identified as a ghost;

means for counting remaining intersecting points which have not exceeded said predetermined number; and means for comparing the number of counted remaining intersecting points to the number of lines-of-bearing from one of said sensors each time said pulse is introduced, wherein when said number of remaining intersecting points is no longer greater than said number of lines-of-bearing from one of said sensors, the remaining intersecting points are identified as valid targets.

2. The processor of claim 1 further comprising:

at least three layers of planar members each having a set of said signal conducting lines from one of said sensors;

a plurality of layers of planar members each having a set of signal conducting lines that are oriented to represent coordinate lines in a coordinate system;

said layers having lines-of-bearing being positioned adjacent to said layers having coordinate lines so that each of said layers having lines-of-bearing is positioned between successive layers having coordinate lines, wherein said pulse introduced at said intersecting points in selected ones of said layers introduces a signal in adjacent layers.

3. The processor of claim 2 wherein said set of signal conducting lines representing coordinate lines in a coordinate system further comprises rows of conductive pads located at each intersecting point in said coordinate system, each conductive pad capable of generating said pulses and also capable of sensing said pulses.

4. The processor of claim 2 wherein said coordinate system is a Cartesian coordinate system.

5. The processor of claim 2 wherein said layers comprise at least seven layers including X and Y coordinate lines and lines representing lines-of-bearing from three sensors, and said layers are arranged so that the first layer contains said Y lines, the second layer contains lines representing lines-of-bearing from a first sensor, the third layer contains said X lines, the fourth contains lines representing lines-of-bearing from a second sensor, the fifth layer contains said Y lines, the sixth layer contains lines representing lines-of-bearing from a third sensor, and the seventh layer contains said X lines.

6. The processor of claim 1 wherein said signal conducting lines are electrically conductive and said signal is an electrical signal.

7. The processor of claim 6 wherein said induced signal in adjacent layers is produced by means of capacitive coupling.

8. The processor of claim 1 wherein said means for initiating a pulse further comprises:

means for producing a signal having a predetermined amplitude;

means for directing said signal to selected ones of said lines according to the predetermined amplitude of said signal.

9. The processor of claim 1 wherein said means for initiating a pulse further comprises:

means for producing a signal having a predetermined frequency; and means for directing said signal to selected ones of said lines according to the predetermined frequency of said signal.

10. A processor for distinguishing real targets from ghosts from angle-only data from at least three sensors, said angle only data including multiple lines-of-bearing from each of said sensors, said processor comprising:

a plurality of signal conducting lines, each of said lines oriented to represent one line-of-bearing from one of said sensors;

means for determining the points where at least three of said lines intersect;

means for initiating a pulse at each of said intersection points, one at a time, said pulse being conducted along said signal conducting lines;

means for counting conducted pulses received at each of said intersecting points;

means for determining when the number of counted pulses at any of said intersecting points exceeds a predetermined number, wherein once said predetermined number is exceeded for a given intersecting point, that point no longer receives pulses and is identified as a ghost;

means for counting remaining intersecting points which have not exceeded said predetermined number; and means for comparing the number of counted remaining intersecting points to the number of lines-of-bearing from one of said sensors each time said pulse is introduced, wherein when said number of remaining intersecting points is no longer greater than said number of lines of bearing from one of said sensors, the remaining intersecting points are identified as valid targets.

11. The processor of claim 10 further comprising:

at least three layers of planar members each having a set of said signal conducting lines from one of said sensors;

a plurality of layers of planar members each having a set of signal conducting lines that are oriented to represent coordinate lines in a coordinate system;

said layers having lines-of-bearing being positioned adjacent to said layers having coordinate lines so that each of said layers having lines-of-bearing is positioned between successive layers having coordinate lines, wherein said pulse introduced at said intersecting points in selected ones of said layers introduces a signal in adjacent layers.

12. The processor of claim 11 wherein said set of signal conducting lines representing coordinate lines in a coordinate system further comprises rows of conductive pads located at each intersecting point in said coordinate system, each conductive pad capable of generating said pulses and also capable of sensing said pulses.

13. The processor of claim 11 wherein said coordinate system is a Cartesian coordinate system.

14. The processor of claim 11 wherein said layers include at least seven layers including X and Y coordinate lines and lines representing lines-of-bearing from three sensors, and said layers are arranged so that the first layer contains said Y lines, the second layer contains lines representing lines-of-bearing from a first sensor, the third layer contains said X lines, the fourth contains lines representing lines-of-bearing from a second sensor, the fifth layer contains said Y lines, the sixth layer contains lines representing lines-of-bearing from a third sensor, and the seventh layer contains said X lines.

15. The processor of claim 10 wherein said signal conducting lines are electrically conductive and said signal is an electrical signal.

16. The processor of claim 15 wherein said induced signal in adjacent layers is produced by means of capacitive coupling.

17. The processor of claim 10 wherein said means for initiating a pulse further comprises:
    means for producing a signal having a predetermined amplitude;
    means for directing said signal to selected ones of said lines according to the predetermined amplitude of said signal.

18. The processor of claim 10 wherein said means for initiating a pulse further comprises:
    means for producing a signal having a predetermined frequency; and
    means for directing said signal to selected ones of said lines according to the predetermined frequency of said signal.

19. A method for distinguishing real targets from ghosts with angle-only data from at least three sensors, said angle-only data including multiple lines-of-bearing from each of said sensors, the improvement comprising:
    positioning a plurality of signal conducting lines, each of said lines oriented to represent one line-of-bearing from one of said sensors;
    determining all intersecting points where at least three of said lines intersect; initiating a signal pulse at each of said intersecting points one at a time, said pulse being conducted along said signal conducting lines;
    counting transmitted pulses received at each of said intersecting points;
    determining when the number of counted pulses at any of said intersecting points exceeds a predetermined number;
    repeating the steps of initiating and counting for only those intersecting points which have not exceeded the predetermined number of received pulses, wherein the other intersecting points become inactive and are identified as ghosts;
    counting the number of remaining intersecting points which have not exceeded said predetermined number and comparing said number of intersecting points to the number of lines-of-bearing from one of said sensors each time said steps of initiating a signal pulse and counting the number of pulses are repeated; and
    identifying the intersecting points which have not exceeded said predetermined number as real targets when said number of remaining intersecting points equals the number of said targets.

* * * * *